United States Patent
Lo et al.

(10) Patent No.: US 11,619,767 B2
(45) Date of Patent: Apr. 4, 2023

(54) NEAR-EYE LIGHT FIELD DISPLAY DEVICE

(71) Applicant: Coretronic Corporation, Hsin-Chu (TW)

(72) Inventors: Hsin-Hsiang Lo, Hsin-Chu (TW); Jui-Yi Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 109 days.

(21) Appl. No.: 17/131,649

(22) Filed: Dec. 22, 2020

(65) Prior Publication Data

US 2022/0082734 A1 Mar. 17, 2022

(30) Foreign Application Priority Data

Sep. 11, 2020 (CN) .......................... 202010950898.4

(51) Int. Cl.
*G02B 3/00* (2006.01)

(52) U.S. Cl.
CPC .................. *G02B 3/0068* (2013.01)

(58) Field of Classification Search
CPC .. G02B 3/0068; G02B 3/0037; G02B 3/0062; G02B 27/0172; G02B 27/0101; G02B 30/27
See application file for complete search history.

(56) References Cited

U.S. PATENT DOCUMENTS

| 9,557,565 B2 | 1/2017 | Luebke et al. | |
| 2004/0156130 A1* | 8/2004 | Powell | G02B 27/09 359/845 |
| 2014/0292620 A1 | 10/2014 | Lapstun | |
| 2020/0192111 A1 | 6/2020 | Ishii et al. | |
| 2020/0201047 A1 | 6/2020 | Nakamura et al. | |

FOREIGN PATENT DOCUMENTS

| CN | 113009692 | 6/2021 |
| GN | 109557666 | 4/2019 |
| TW | I688790 | 3/2020 |
| WO | 2020162258 | 8/2019 |
| WO | 2019203868 | 10/2019 |

OTHER PUBLICATIONS

"Office Action of Taiwan Counterpart Application", dated Feb. 25, 2021, p. 1-p. 5.
Applied Optics and Optical Design Basis, "The base point position and focal length calculation formula of", retrieved on Oct. 11, 2022, with English translation thereof, pp. 1-10. Available at: https://www.guayunfan.com/lilun/565721.html.
"Office Action of China Counterpart Application", dated Jul. 22, 2022, p. 1-p. 9.

* cited by examiner

*Primary Examiner* — James C. Jones
(74) *Attorney, Agent, or Firm* — JCIPRNET

(57) ABSTRACT

A near-eye light field display device is provided. The near-eye light field display device includes a first lens, a micro-lens array, a second lens, and a display panel. The display panel is adapted to provide an image beam. An eye-side surface of the micro-lens array is provided with a plurality of eye-side micro lenses, and a display-side surface thereof is provided with a plurality of display-side micro lenses. The eye-side micro lenses are arranged equidistantly in a first pitch. The display-side micro lenses are arranged equidistantly in a second pitch. The first pitch is different from the second pitch.

13 Claims, 9 Drawing Sheets

NEAR-EYE LIGHT FIELD DISPLAY DEVICE

CROSS-REFERENCE TO RELATED APPLICATION

This application claims the priority benefit of China application serial no. 202010950898.4, filed on Sep. 11, 2020. The entirety of the above-mentioned patent application is hereby incorporated by reference herein and made a part of this specification.

BACKGROUND

Technical Field

The disclosure relates to a display device, and particularly, to a near-eye light field display device.

Description of Related Art

Generally, light field displays come in two architectures, i.e., a spatial-multiplexed type and a time-multiplexed type. In a time-multiplexed light field display, a micro-electromechanical device is used to change the position of a virtual image to adjust the clarity of the front and rear scenes. In a spatial-multiplexed light field display, a display device such as a micro-LED display, a micro-OLED display, and an LCD is used, and light field sub-images are passed through an optical element such as a micro-lens array to stack parallax images on the retina, so that the user can view a light field image with depth.

In the existing spatial-multiplexed light field displays, the micro-lens array projects the light field sub-images of the panel display into the user's retina, and the user can see a virtual light field image formed by multiple sub-images stacked on each other. However, when the user views the micro-lens array at different viewing angles, the light field image at large viewing angles will be blurred, and as the viewing angle increases, the blurring becomes more and more significant, which leads to poor optical quality of the existing spatial-multiplexed light field displays.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure provides a near-eye light field display device having excellent display quality.

Other objectives and advantages of the disclosure can be further understood from the technical features disclosed herein.

An embodiment of the disclosure provides a near-eye light field display device including a first lens, a micro-lens array, a second lens, and a display panel sequentially arranged from an eye side to a display side along a central optical axis. The display panel is adapted to provide an image beam. The micro-lens array has an eye-side surface facing the eye side and allowing the image beam to pass through, and a display-side surface facing the display side and allowing the image beam to pass through. The eye-side surface of the micro-lens array is provided with a plurality of eye-side micro lenses, and the display-side surface of the micro-lens array is provided with a plurality of display-side micro lenses. The plurality of eye-side micro lenses are arranged equidistantly in a first pitch, the plurality of display-side micro lenses are arranged equidistantly in a second pitch, and the first pitch is different from the second pitch.

In an embodiment of the disclosure, the first pitch is less than the second pitch.

In an embodiment of the disclosure, the micro-lens array satisfies a conditional formula: $f_{MLA} > 0$, where $f_{MLA}$ is defined by an equation below:

$$\frac{1}{f_{MLA}} = (n-1)\left(\frac{1}{R_1} - \frac{1}{R_2} + \frac{(n-1)d}{nR_1R_2}\right)$$

where $f_{MLA}$ is an equivalent focal length of the micro-lens array, and n is a refractive index of a material of the micro-lens array. Each of the eye-side micro lenses has a first curved surface facing the eye side, each of the display-side micro lenses has a second curved surface facing the display side, $R_1$ is a radius of curvature of the first curved surface, $R_2$ is a radius of curvature of the second curved surface, and d is a distance between the eye-side surface and the display-side surface.

In an embodiment of the disclosure, a central eye-side micro lens among the plurality of eye-side micro lenses and a central display-side micro lens among the plurality of display-side micro lenses are optically coaxial with each other.

In an embodiment of the disclosure, each of the eye-side micro lenses has a first optical axis, and each of the display-side micro lenses has a second optical axis. The plurality of eye-side micro lenses correspond to the plurality of display-side micro lenses in a one-to-one manner. Except for a central eye-side micro lens and its corresponding central display-side micro lens, a distance from the first optical axis of any of the eye-side micro lenses to the central optical axis is defined as a first distance, a distance from the second optical axis of the corresponding display-side micro lens to the central optical axis is defined as a second distance, and an absolute value of a difference between the first distance and the second distance increases from the central optical axis along a radial direction.

In an embodiment of the disclosure, a radial direction from the central optical axis to an edge of the micro-lens array is defined. Each of the eye-side micro lenses has a first optical axis. Each of the display-side micro lenses has a second optical axis. The plurality of eye-side micro lenses correspond to the plurality of display-side micro lenses in a one-to-one manner. Except for a central eye-side micro lens and its corresponding central display-side micro lens, the first optical axis of any of the eye-side micro lenses and the second optical axis of the corresponding display-side micro lens are parallel to each other and have a non-zero distance therebetween.

In an embodiment of the disclosure, each of the eye-side micro lenses has a convex surface facing the eye side, and each of the display-side micro lenses has a convex surface facing the display side.

In an embodiment of the disclosure, each of the eye-side micro lenses has a concave surface facing the eye side, and each of the display-side micro lenses has a convex surface facing the display side.

In an embodiment of the disclosure, each of the eye-side micro lenses has a convex surface facing the eye side, and each of the display-side micro lenses has a concave surface facing the display side.

In an embodiment of the disclosure, the plurality of eye-side micro lenses and the plurality of display-side micro lenses are respectively arranged in an array.

In an embodiment of the disclosure, the plurality of eye-side micro lenses are arranged radially around the central optical axis, and the plurality of display-side micro lenses are arranged radially around the central optical axis.

In an embodiment of the disclosure, the first lens and the second lens both have a positive refractive power.

In an embodiment of the disclosure, a number of the plurality of eye-side micro lenses is equal to a number of the plurality of display-side micro lenses.

Based on the above, in the near-eye light field display device of the embodiment of the disclosure, the micro-lens array is disposed between the first lens and the second lens, the eye-side surface and the display-side surface of the micro-lens array are respectively provided with a plurality of eye-side micro lenses and a plurality of display-side micro lenses, and the pitch of the eye-side micro lenses is different from the pitch of the display-side micro lenses. With this design, the brightness of the light field image at a large viewing angle can be increased, and the issue of optical vignetting can be solved. Therefore, the near-eye light field display device has excellent display quality.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the exemplary embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
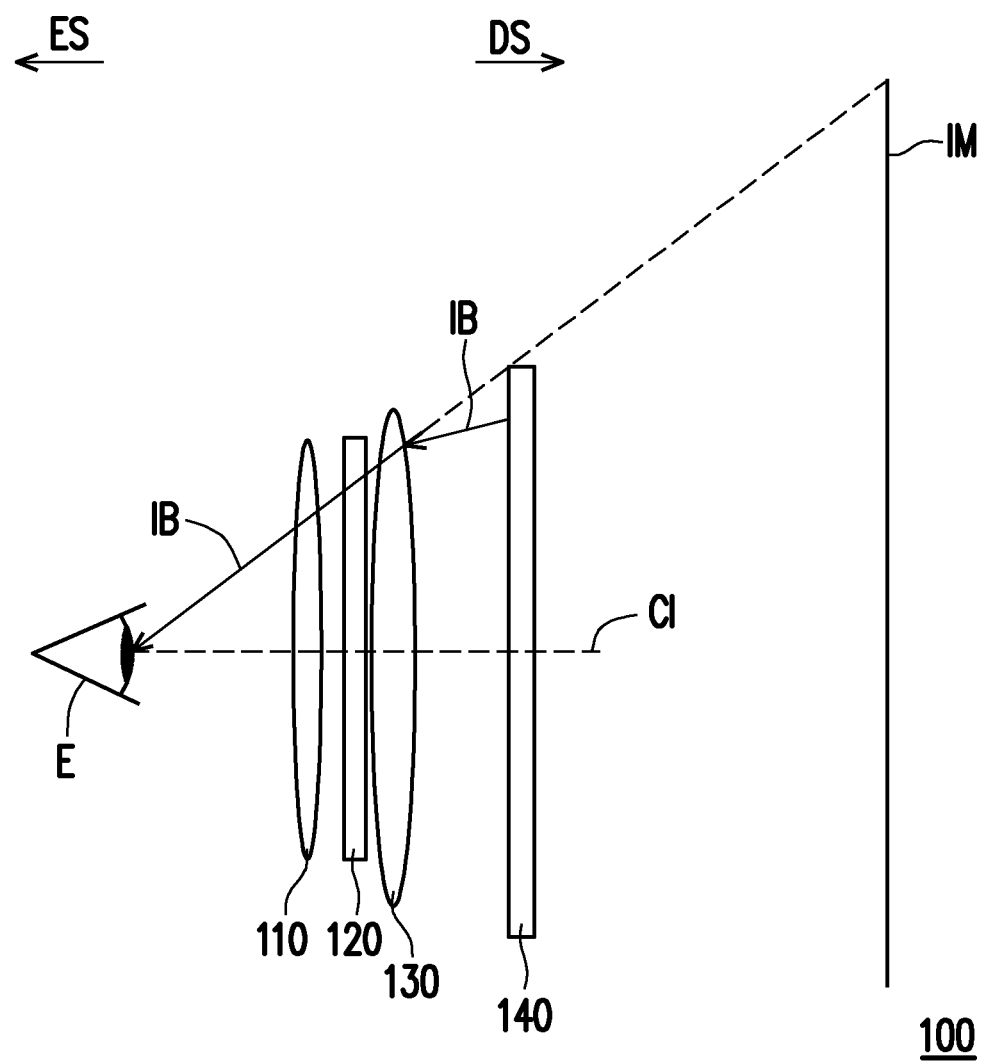
FIG. 1 is a schematic view of an optical architecture of a near-eye light field display device according to an embodiment of the disclosure.

FIG. 1 is a schematic view of an optical architecture of a near-eye light field display device according to an embodiment of the disclosure.

Figure 2:
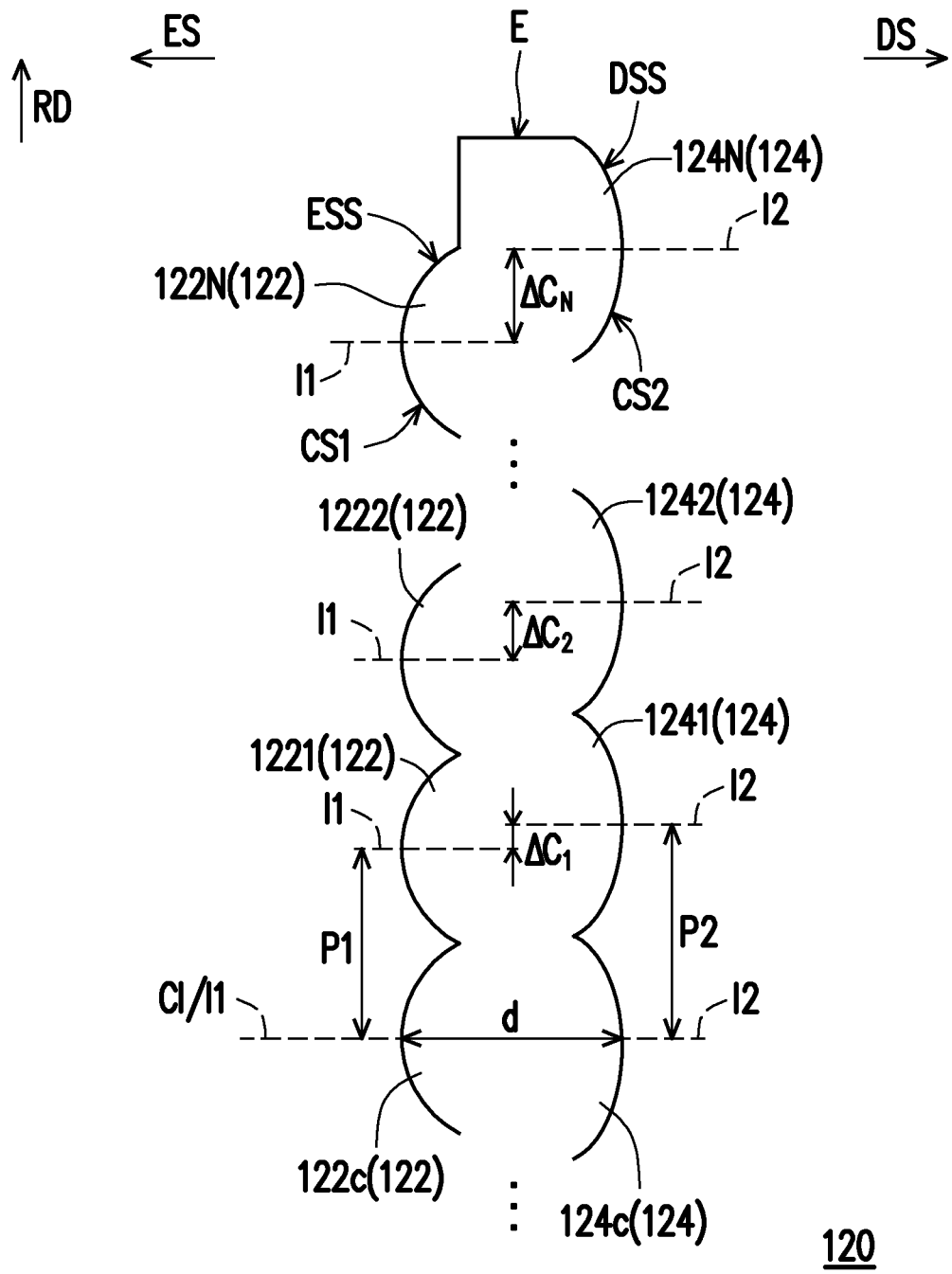
FIG. 2 is a schematic enlarged cross-sectional view of the micro-lens array.

Referring to FIG. 1, in this embodiment, a near-eye light field display device 100 is disposed in front of an eye E of a user and includes a first lens 110, a micro-lens array 120, a second lens 130, and a display panel 140 sequentially arranged from an eye side ES to a display side DS along a central optical axis CI. The eye side ES is the side on which the eye E is located, the display side DS represents the side on which the display panel 140 is located, and the display panel 140 is adapted to provide an image beam IB having an image content. The central optical axis CI refers to the optical axis of the near-eye light field display device 100. It is noted that the position of the micro-lens array 120 in FIG. 1 is indicated by a box, and FIG. 2 shows the specific configuration of the micro-lens array 120 according to an embodiment of the disclosure. The above components will be described in detail in the following paragraphs.

The first lens 110 and the second lens 130 are optical elements having a refractive power and a high transmittance. The refractive powers of the first lens 110 and the second lens 130 are both positive, and their material may be plastic or glass, but the disclosure is not limited thereto. In this embodiment, the first lens 110 and the second lens 130 are both convex lenses, but are not limited thereto. In other embodiments, the first lens 110 and the second lens 130 may be spherical lenses, aspheric lenses, or a combination thereof, but are not limited thereto.

The display panel 140 is a photoelectric element having a display function and is adapted to provide an image beam IB having an image content. Its type may include a micro LED display, a mini LED display, a micro-OLED display, an LCD display, or display panels of other different types, and the disclosure is not limited thereto.

Figure 3A:
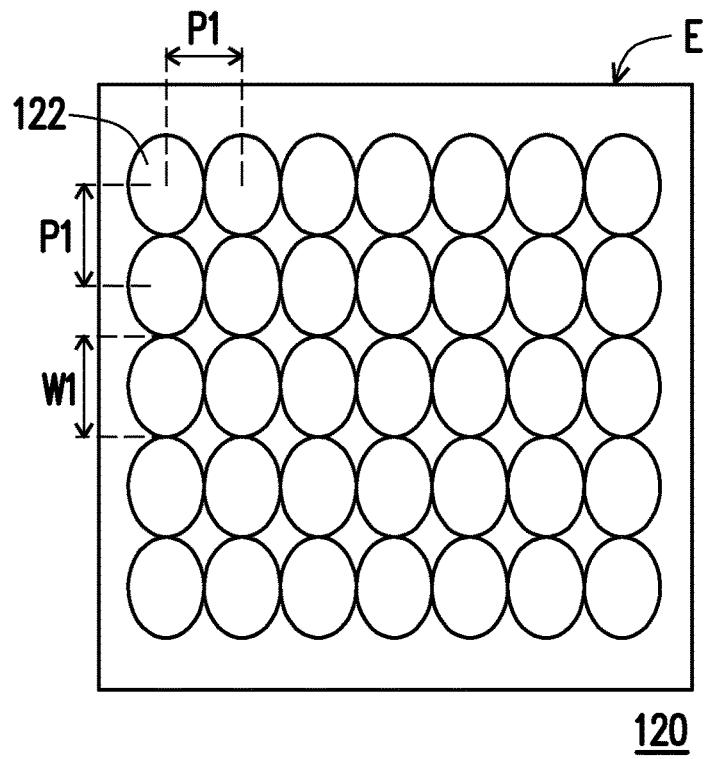
FIG. 3A is a front view of the micro-lens array of the embodiment of FIG. 1 viewed from the eye side to the display side.
Figure 3B:
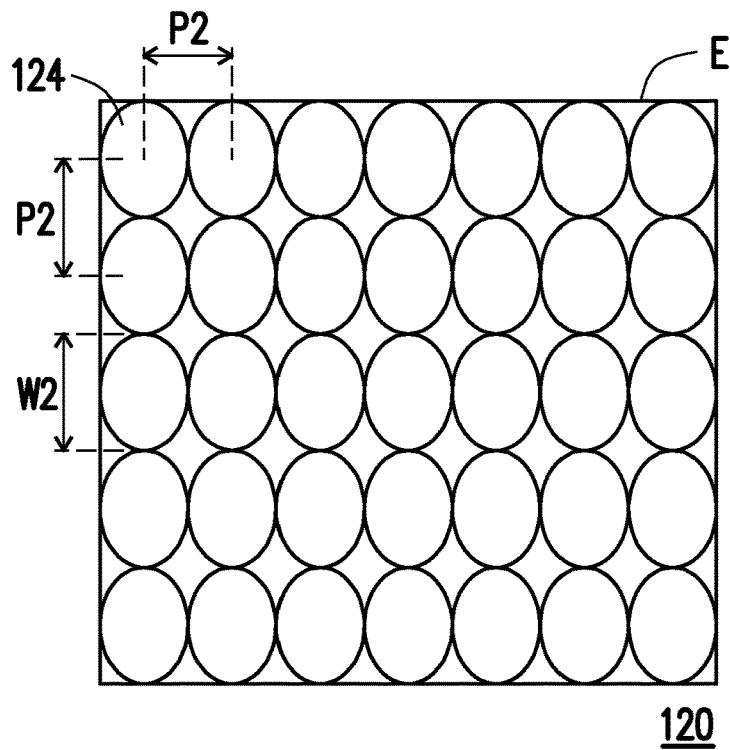
FIG. 3B is a front view of the micro-lens array of the embodiment of FIG. 1 viewed from the display side to the eye side.

FIG. 2 is a schematic enlarged cross-sectional view of the micro-lens array. FIG. 3A is a front view of the micro-lens array of the embodiment of FIG. 1 viewed from the eye side to the display side. FIG. 3B is a front view of the micro-lens array of the embodiment of FIG. 1 viewed from the display side to the eye side.

Referring to FIG. 2, FIG. 3A and FIG. 3B, the micro-lens array 120 has an eye-side surface ESS on the eye side ES and a display-side surface DSS on the display side DS, which respectively face the eye side ES and the display side DS and allow the image beam IB to pass through. Corresponding to FIG. 2, the eye side ES is the side on which the eye E is located, and the display side DS represents the side on which the display panel 140 is located. The eye-side surface ESS includes a plurality of eye-side micro lenses 122 arranged equidistantly in a pitch P1, and the display-side surface DSS includes a plurality of display-side micro lenses 124 arranged equidistantly in a pitch P2. The pitch P1 is different from the pitch P2 and is, for example, less than the pitch P2. As shown in FIG. 3A and FIG. 3B, a size W1 of the eye-side micro lenses 122 and a size W2 of the display-side micro lenses 124 are, for example, millimeter-level sizes, the sizes are, for example, in a range from 0.5 mm to 4 mm, and the size W2 of the display-side micro lenses 124 is greater than the size W1 of the eye-side micro lenses 122, but are not limited thereto.

Referring to FIG. 2, in the eye-side surface ESS, the eye-side micro lenses 122 all have optical axes I1, and the optical axes I1 are parallel to each other. In this embodiment, each eye-side micro lens 122 has a convex surface facing the eye side ES, but is not limited thereto. In the display-side surface DS, the display-side micro lenses 124 all have optical axes I2, and the optical axes I2 are parallel to each other. In this embodiment, each display-side micro lens 124 has a convex surface facing the display side DS, but is not limited thereto. Referring to FIG. 3A and FIG. 3B, the eye-side micro lenses 122 are, for example, arranged in an array, and the display-side micro lenses 124 are, for example, arranged in an array, but are not limited thereto. The number of the eye-side micro lenses 122 is, for example, equal to the number of the display-side micro lenses 124, and the eye-side micro lenses 122 correspond to the display-side micro lenses 124 in a one-to-one manner (or referred to as "respectively corresponding"). Specifically, one eye-side micro lens 122 and its corresponding one display-side micro lens 124 may generate a virtual image range for the eye E, and the virtual image ranges at least partially overlap with each other. By configuring the image beam IB generated by the display panel 140 to correspond to each display-side micro lens 124, a three-dimensional depth image is formed by combining the overlapping virtual image ranges.

Referring to FIG. 2 again, in this embodiment, the eye-side micro lens 122 having the optical axis I1 coincident with the central optical axis CI is referred to as a central eye-side micro lens 122c. The display-side micro lens 124 having the optical axis I2 coincident with the central optical axis CI is referred to as a central display-side micro lens 124c. The optical axes I1 and I2 of the central eye-side micro lens 122c and the central display-side micro lens 124c are optically coaxial with each other and are optically coaxial with the central optical axis CI.

To describe the design of the micro-lens array 120, some names will be defined in this paragraph. Specifically, in a radial direction RD from the central optical axis CI to an edge E of the micro-lens array 120, the eye-side micro lens 122 closest to the central eye-side micro lens 122c is referred to as a first eye-side micro lens 1221, the eye-side micro lens 122 second closest to the central eye-side micro lens 122c is referred to as a second eye-side micro lens 1222, the eye-side micro lens 122 farthest from the central eye-side micro lens 122c (or referred to as the eye-side micro lens 122 closest to the edge E) is referred to as an $N^{th}$ eye-side micro lens 122N, and so on. Similarly, the display-side micro lens 124 closest to the central display-side micro lens 124c is referred to as a first display-side micro lens 1241, the display-side micro lens 124 second closest to the central display-side micro lens 124c is referred to as a second display-side micro lens 1242, the display-side micro lens 124 farthest from the central display-side micro lens 124c (or referred to as the display-side micro lens 124 closest to the edge E) is referred to as an $N^{th}$ display-side micro lens 124N, and so on. In this embodiment, the central eye-side micro lens 122c corresponds to the central display-side micro lens 124c, the first eye-side micro lens 1221 corresponds to the first display-side micro lens 1241, the second eye-side micro lens 1222 corresponds to the second display-side micro lens 1242, and so on.

Moreover, except for the optical axes I1 and I2 of the central eye-side micro lens 122c and the central display-side micro lens 124c which are optically coaxial with each other, since the eye-side micro lenses 122 and the display-side micro lenses 124 are respectively arranged in the pitches P1 and P2 of different sizes, the optical axes I1 and I2 of the other eye-side micro lenses 122 and the other display-side micro lenses 124 which correspond to each other are not optically axial with each other (or referred to as "being staggered"). For example, the first eye-side micro lens 1221 and the first display-side micro lens 1241 are a first micro lens group, and the second eye-side micro lens 1222 and the second display-side micro lens 1242 are a second micro lens group. A non-zero distance $\Delta C_1$ is present between the optical axis I1 of the first eye-side micro lens 1221 and the optical axis I2 of the first display-side micro lens 1241 of the first micro lens group, a non-zero distance $\Delta C_2$ is also present between the optical axis I1 of the second eye-side micro lens 1222 and the optical axis I2 of the second display-side micro lens 1242 of the second micro lens group, a non-zero distance $\Delta C_N$ is also present between the optical axis I1 of the $N^{th}$ eye-side micro lens 122N and the optical axis I2 of the $N^{th}$ display-side micro lens 124N of the $N^{th}$ micro lens group, and so on. The non-zero distances $\Delta C_1$, $\Delta C_2$, ... $\Delta C_N$ of the above micro lens groups having a correspondence may be calculated based on a difference between the distance from the optical axis I1 of any eye-side micro lens 122 other than the central eye-side micro lens 122c to the central optical axis CI, and the distance from the optical axis I2 of the corresponding display-side micro lens 124 to the central optical axis CI, and the absolute values of the non-zero distances $\Delta C_1, \Delta C_2, \ldots \Delta C_N$ increase from the central optical axis CI along the radial direction RD, or referred to as increasing as the distance from the central optical axis CI increases.

In other words, in the micro-lens array 120, a micro-lens arrangement design with unequal pitches P1 and P2 is adopted. At the central viewing angle (FOV=0 degrees), the micro lenses 122c and 124c respectively on the eye-side surface ESS and the display-side surface DSS have the same optical axis, and as the viewing angle increases, the micro lenses 122 and 124 on the eye-side surface ESS and the display-side surface DSS have different optical axes, and the distances $\Delta C_1, \Delta C_2, \ldots \Delta C_N$ between the two optical axes I1 and I2 in the corresponding micro lens group increases along with the viewing angle.

Figure 4A:
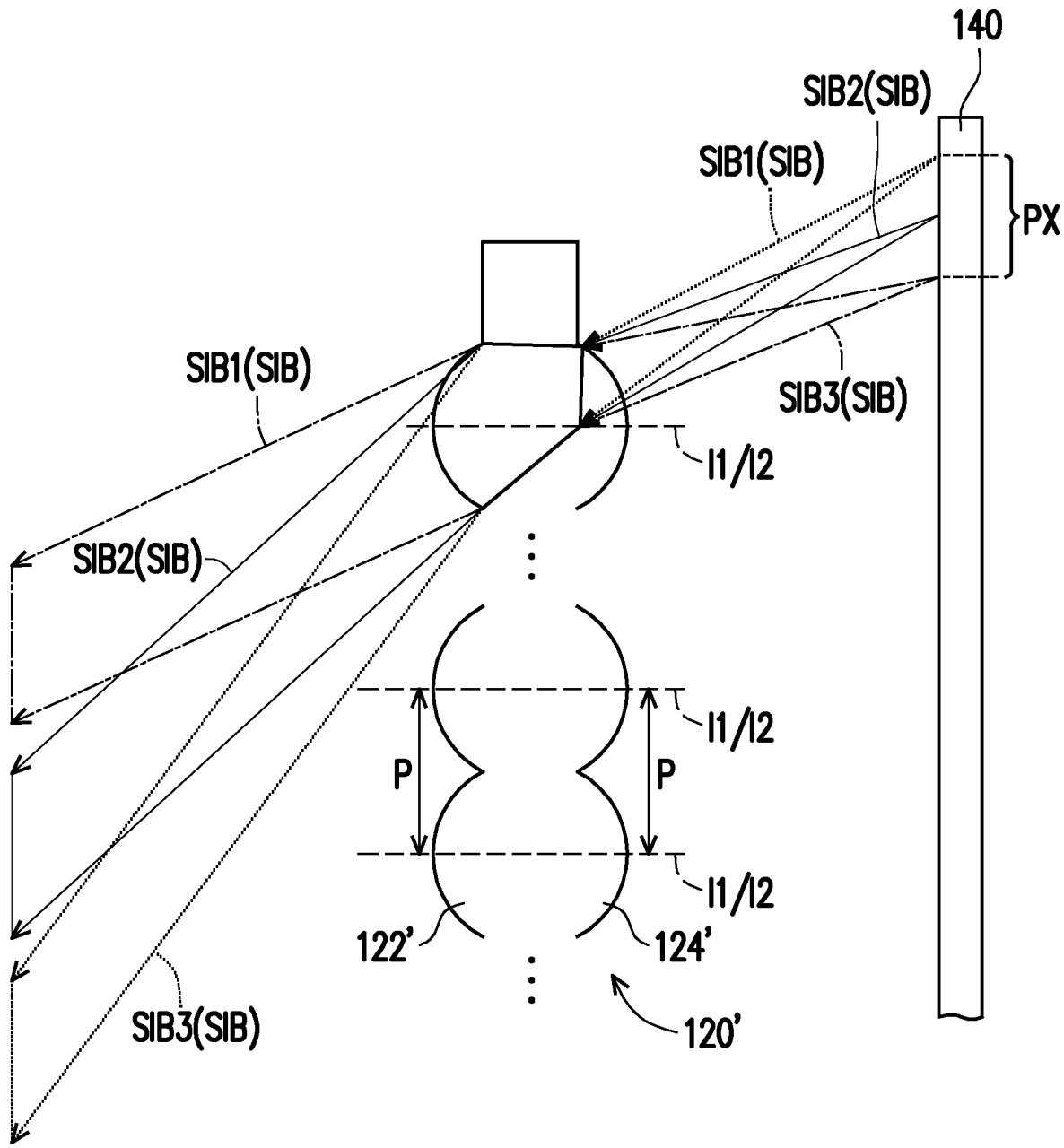
FIG. 4A is a schematic view of an optical path of an image beam passing through a micro-lens array of a comparative embodiment.
Figure 4B:
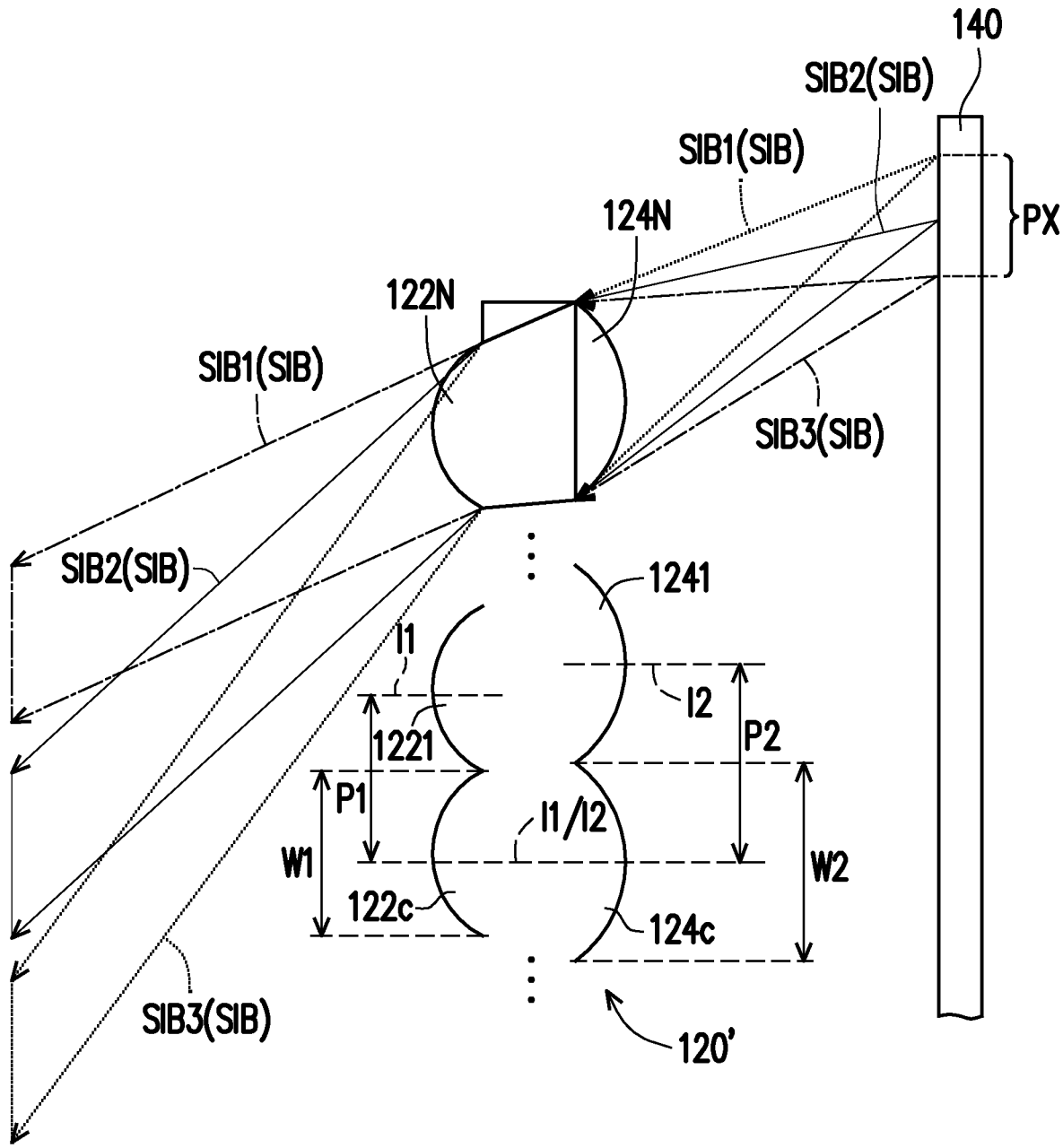
FIG. 4B is a schematic view of an optical path of an image beam passing through the micro-lens array of the embodiment in FIG. 2.

FIG. 4A is a schematic view of an optical path of an image beam passing through a micro-lens array of a comparative embodiment. FIG. 4B is a schematic view of an optical path of an image beam passing through the micro-lens array of the embodiment in FIG. 2.

The optical effects of this embodiment will be described in detail in the following paragraphs. In addition, to further highlight the optical effects of this embodiment achieved by the configuration of the micro-lens array described above, a micro-lens array 120' of a comparative embodiment shown in FIG. 4A will be taken for comparison in the following paragraphs. The micro-lens array 120' of the comparative embodiment is similar to the micro-lens array 120, and the main difference lies in that the optical axes I1 of the eye-side micro lenses 122' are respectively optically coaxial with the optical axes I2 of the display-side micro lenses 124', and the eye-side micro lenses 122' and the display-side micro lenses 124' are all arranged equidistantly in a pitch P. It is noted that the first lens 110 and the second lens 130 are not shown in FIG. 4A and FIG. 4B.

Referring to FIG. 1, in brief, after the display panel 140 emits an image beam IB, the image beam IB sequentially passes through the second lens 130, the micro-lens array 120, and the first lens 110 along the central optical axis CI, and then is transmitted to the eye E, so that the eye E perceives a light field image IM with depth on the display side DS.

The display panel 140 has a plurality of display regions PX configured to provide a plurality of sub-image beams SIB, and each sub-image beam SIB is transmitted to one corresponding display-side micro lens 124 and one corresponding eye-side micro lens 122. Specifically, after the sub-image beam SIB is transmitted to the one corresponding display-side micro lens 124, the sub-image beam SIB is then emitted from the eye-side micro lens 122 corresponding to the display-side micro lens 124.

The image beam IB provided by the display panel 140 in FIG. 1 actually includes the sub-image beams SIB emitted by the display regions PX at different positions on the display panel 140 in FIG. 4A and FIG. 4B, and the sub-image beams SIB may include at least beams SIB1 to SIB3. Only after the sub-image beam SIB sequentially passes through the display-side micro lens 124 (124') and the eye-side micro lens 122 (122') which correspond to each other can it be well transmitted to the eye E so that the eye E sees the light field image IM at different positions. FIG. 4A and FIG. 4B schematically show three beams SIB1 to SIB3 emitted from different positions of the display region PX at the edge, and it is clear that the sub-image beam SIB in the comparative embodiment of FIG. 4A cannot respectively correspond to the display-side micro lens 124 and the eye-side micro lens 122 in a one-to-one manner, while the sub-image beam SIB generated by the display region PX in FIG. 4B can respectively correspond to a group of the display-side micro lens 124 and the eye-side micro lens 122. In other words, the sub-image beam provided by one display region PX is correspondingly transmitted to one display-side micro lens 124 and one eye-side micro lens 122.

Specifically, if the near-eye light field display device adopts the micro-lens array 120' having an arrangement design of the equal pitch P as shown in FIG. 4A, at a large-angle field of view (FOV, e.g., greater than 50 degrees), since the sub-image beam SIB is incident on the micro-lens array 120' in an oblique manner, and the eye-side micro lenses 122' and the display-side micro lenses 124' are arranged in the equal pitch P, the sub-image beam SIB can only pass through half of the display-side micro lens 124' at the edge and the eye-side micro lens 122' and then transmitted to the eye E. In other words, the optical correspondence between the eye-side micro lens 122' and the display-side micro lens 124' at the edge of the micro-lens array 120' is not a one-to-one correspondence, which will cause the light field image IM at the edge to be darker (i.e., the optical efficiency is low, and the image is less clear). However, at a small-angle FOV (e.g., approximating 0 degrees), since the sub-image beam (not shown) emitted from the display region at the center of the display panel 140 is incident on the micro-lens array 120' in an almost perpendicular manner, it can completely sequentially pass through the display side micro lens 124' and the eye-side micro lens 122' and then be transmitted to the eye, so that the light field image IM at the center is brighter (i.e., the optical efficiency is higher, and the image is clearer). The phenomenon that the brightness of the edge region of the light field image IM is lower than that of the center region is referred to as optical vignetting. Therefore, adopting the micro-lens array 120' of the comparative embodiment in the near-eye light field display device will result in poor display quality.

In contrast, if the near-eye light field display device 100 adopts the micro-lens array 120 having an arrangement design of the unequal pitches P1 and P2 as shown in FIG. 2 and FIG. 4B, at a large-angle FOV, with the arrangement design of the eye-side micro lenses 122 and the display-side micro lenses 124 in the unequal pitches P1 and P2, the sub-image beam SIB can be completely received by the eye-side micro lens 122 and the display-side micro lens 124 at the edge and transmitted to the eye. In other words, the optical correspondence between the eye-side micro lens 122N and the display-side micro lens 124N at the edge of the micro-lens array 120 is a one-to-one correspondence, and this design can achieve the effects of improving the brightness of large viewing angle images and effectively eliminating optical vignetting.

Figure 5:
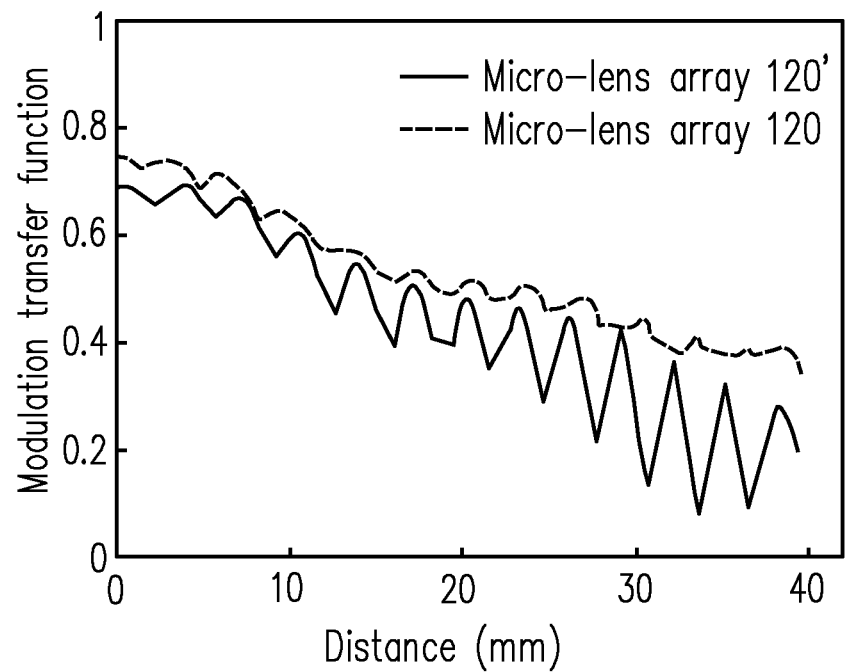
FIG. 5 is a simulation diagram of a relationship between a modulation transfer function (MTF) of the different micro-lens arrays of FIG. 4A and FIG. 4B and different positions of the display panel.
Figure 6:
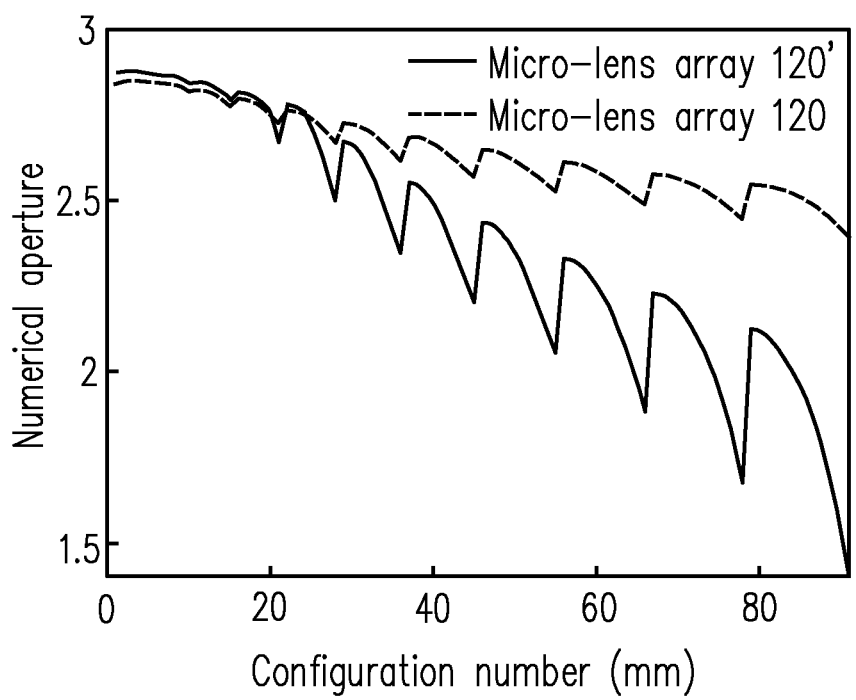
FIG. 6 is a simulation diagram of a relationship between a numerical aperture (NA) and a configuration number of the different micro-lens arrays of FIG. 4A and FIG. 4B.

FIG. 5 is a simulation diagram of a relationship between a modulation transfer function of the different micro-lens arrays of FIG. 4A and FIG. 4B and different positions of the display panel, where the horizontal axis in FIG. 5 represents the distance (unit: millimeter) from any part of the display panel to the center of the display panel, and the vertical axis represents the value (unit: dimensionless) of the modulation transfer function. FIG. 6 is a simulation diagram of a relationship between a numerical aperture and a configuration number of the different micro-lens arrays of FIG. 4A and FIG. 4B, where a larger value of the configuration number (unit: millimeter) on the horizontal axis in FIG. 6 represents the position of the micro lens at a larger viewing angle and vice versa, and the vertical axis in FIG. 6 represents the numerical aperture value (unit: dimensionless). In FIG. 5 and FIG. 6, the dashed line represents the simulation performed with the micro-lens array 120 adopting the design of the unequal pitches P1 and P2, and the solid line represents the simulation performed with the micro-lens array 120' adopting the design of the equal pitch P.

Referring to FIG. 5 first, FIG. 5 is a simulation relationship diagram performed at a spatial frequency of 28 cyc/mm, and the protrusions of the solid lines and dashed lines in FIG. 5 represent the number of the micro lens groups having a correspondence. A larger value on the horizontal axis represents the position of the display panel at a larger viewing angle, and it can be seen that the value of the modulation transfer function adopting the micro-lens array 120 is better than the value of the modulation transfer function adopting the micro-lens array 120'. In other words, the micro-lens array 120 adopting the design of the unequal pitches P1 and P2 can have excellent image resolution at a large viewing angle and namely have excellent image quality. Moreover, since the micro-lens array 120' adopts the design of the equal pitch P, it is difficult to optimize the single micro lens edge, and namely, the solid line fluctuates more significantly at a large viewing angle. In contrast, since the micro-lens array 120 adopts the design of the unequal pitches P1 and P2, the dashed line fluctuates less significantly at a large viewing angle.

Next, referring to FIG. 6, the simulation result in FIG. 6 concerns the light at the center of the eye corresponding to the center of the micro lens, and the numerical aperture is calculated based on the light. It can be seen from FIG. 6 that the numerical aperture change of the solid line is far more significant than the numerical aperture change of the dashed line, and the numerical aperture decreases more significantly at a large viewing angle, which means that the cone angle of light decreases more significantly. Therefore, in the micro-lens array 120' adopting the design of the equal pitch P as represented by the solid line, there is less effective light at a large viewing angle, which is unfavorable for working with other optical elements (e.g., a backlight module). In contrast, in the micro-lens array 120 adopting the design of the different pitches P1 and P2 as represented by the dashed line, the numerical aperture decreases far less significantly than the solid line, so that the light cone angle at a large viewing angle and the light cone angle at a small viewing angle can be more consistent.

Figure 7:
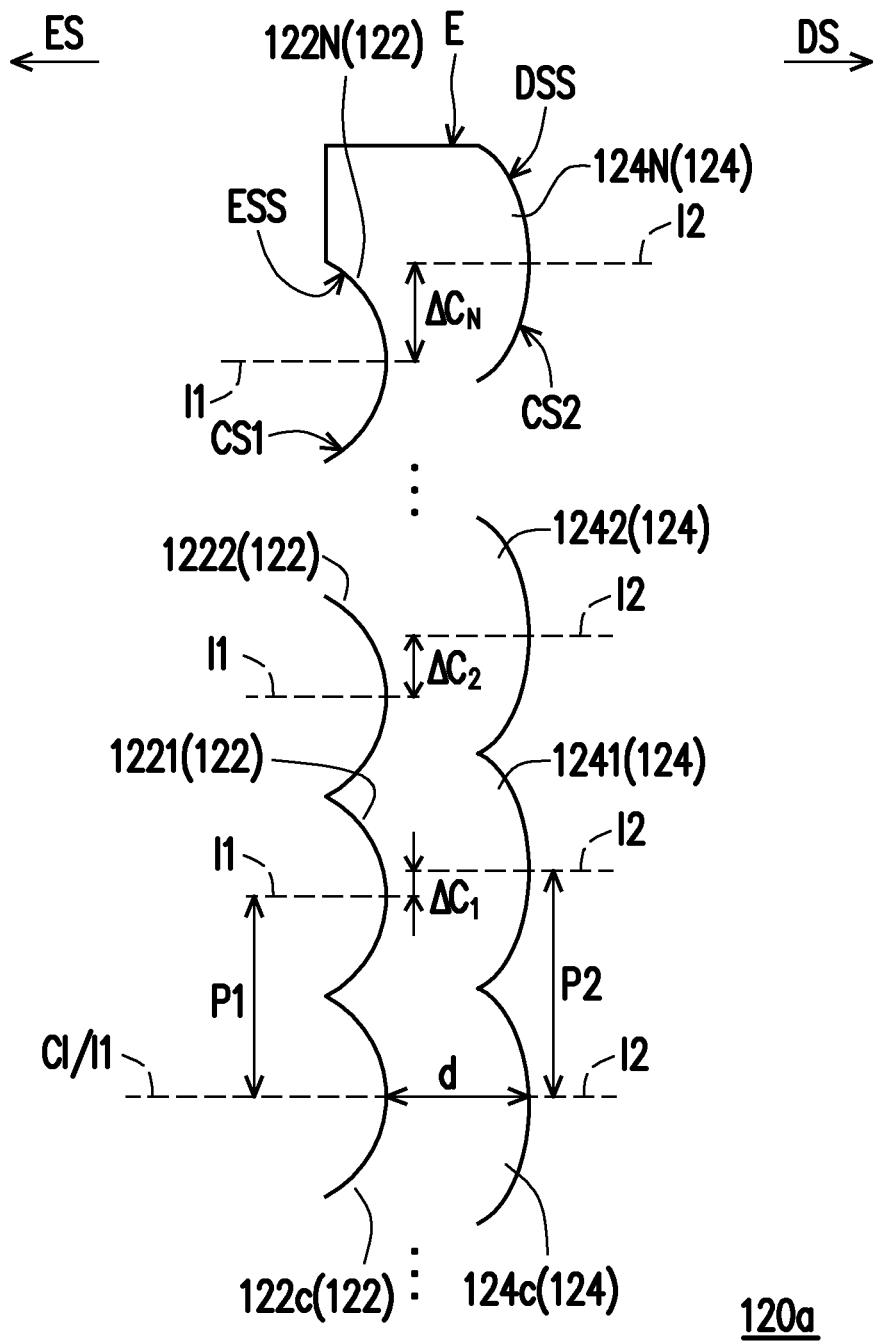
FIG. 7 and FIG. 8 are respectively schematic side views of micro-lens arrays according to different embodiments of the disclosure.
Figure 8:
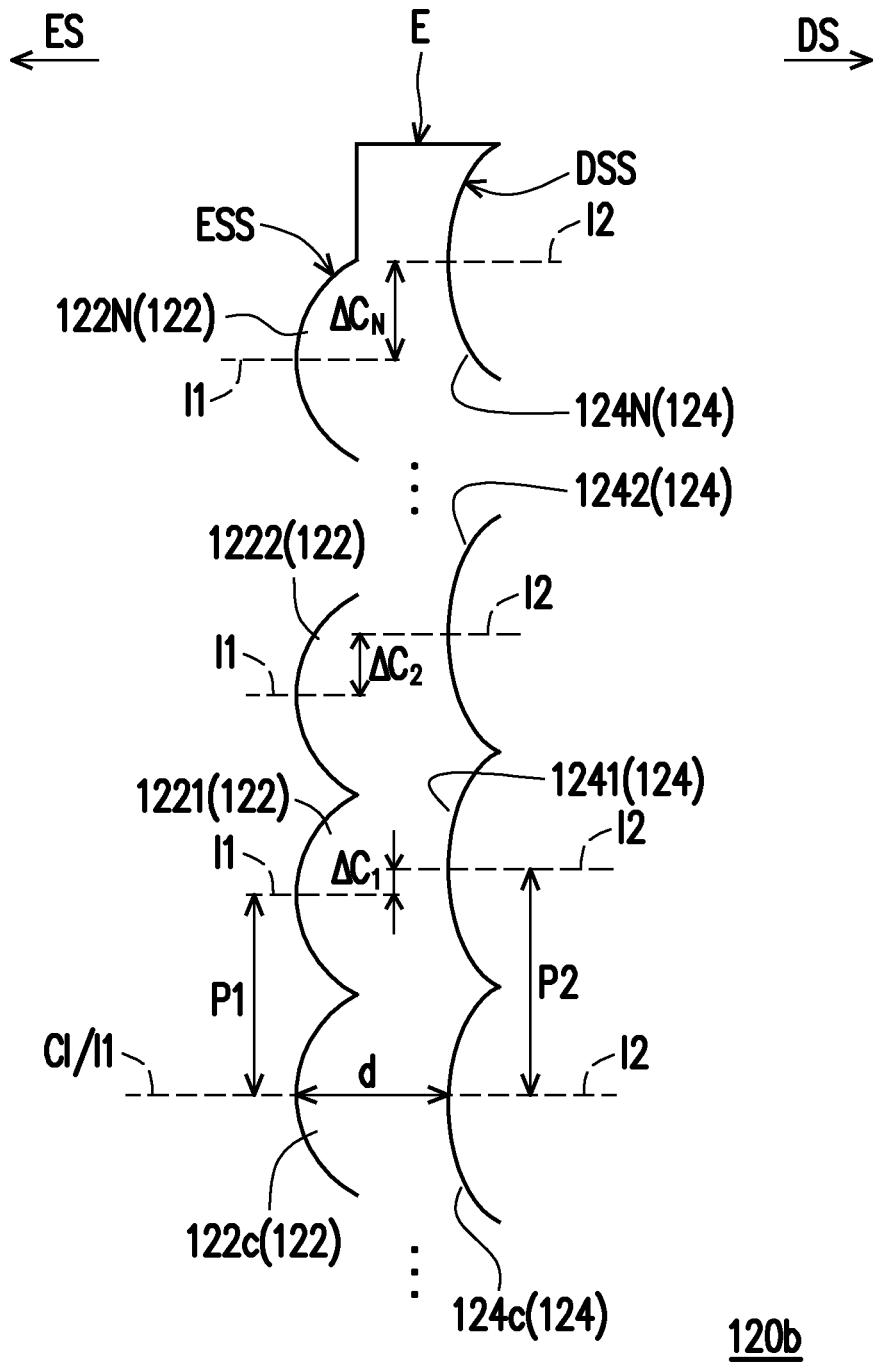

The surface configurations of the eye side ES and the display side DS of the micro-lens array 120 may be adjusted according to the actual requirements. FIG. 7 and FIG. 8 are respectively schematic side views of micro-lens arrays according to different embodiments of the disclosure.

Referring to FIG. 7, a micro-lens array 120a of this embodiment is substantially similar to the micro-lens array 120 of FIG. 2, and the main difference lies in that each eye-side micro lens 122 has a concave surface facing the eye side ES, each display-side micro lens 124 has a convex surface facing the display side DS, and the micro-lens array 120a has a positive focal length.

Referring to FIG. 8, a micro-lens array 120b of this embodiment is substantially similar to the micro-lens array 120 of FIG. 2, and the main difference lies in that each eye-side micro lens 122 has a convex surface facing the eye-side ES, each display-side micro lens 124 has a concave surface facing the display side DS, and the micro-lens array 120b has a positive focal length.

In addition, the above micro-lens arrays 120, 120a, and 120b further satisfy the following conditional formula: $f_{MLA} > 0$, where $f_{MLA}$ is defined by the following equation:

$$\frac{1}{f_{MLA}} = (n-1)\left(\frac{1}{R_1} - \frac{1}{R_2} + \frac{(n-1)d}{nR_1R_2}\right)$$

$f_{MLA}$ is the equivalent focal length of the micro-lens arrays 120, 120a, and 120b, n is the refractive index of the material of the micro-lens arrays 120, 120a, and 120b, where each eye-side micro lens 122, 122a, and 122b has a curved surface CS1 facing the eye side ES, each display-side micro lens 124, 124a, and 124b has a curved surface CS2 facing the display side DSS, $R_1$ is the radius of curvature of the curved surface CS1, $R_2$ is the radius of curvature of the curved surface CS2, and d is the distance between the eye-side surface ESS and the display-side surface DSS on the central optical axis CI.

Figure 9A:
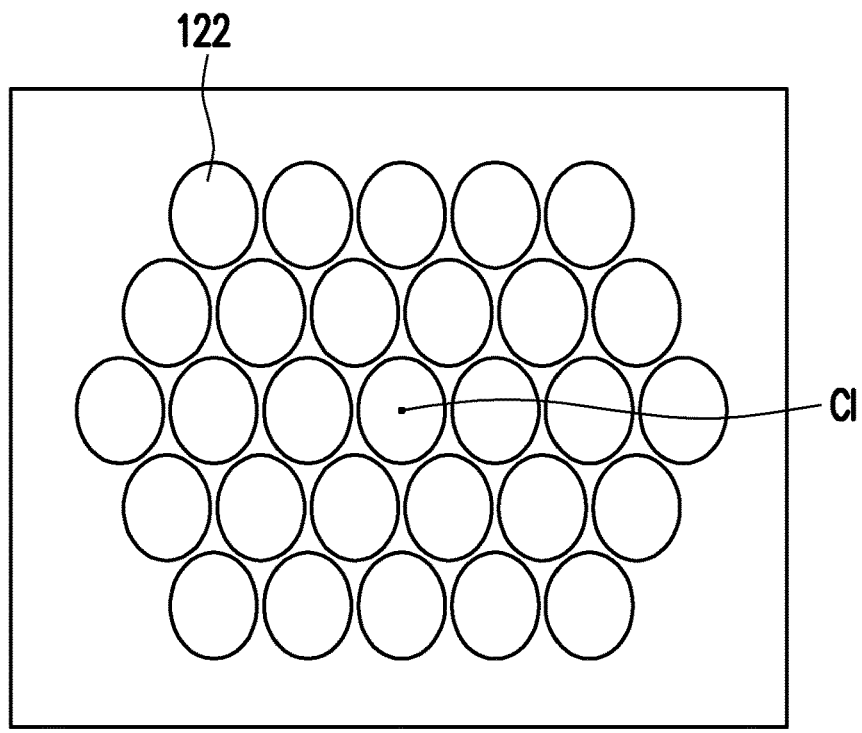
FIG. 9A is a front view of a micro-lens array according to another embodiment of the disclosure viewed from the eye side to the display side.
Figure 9B:
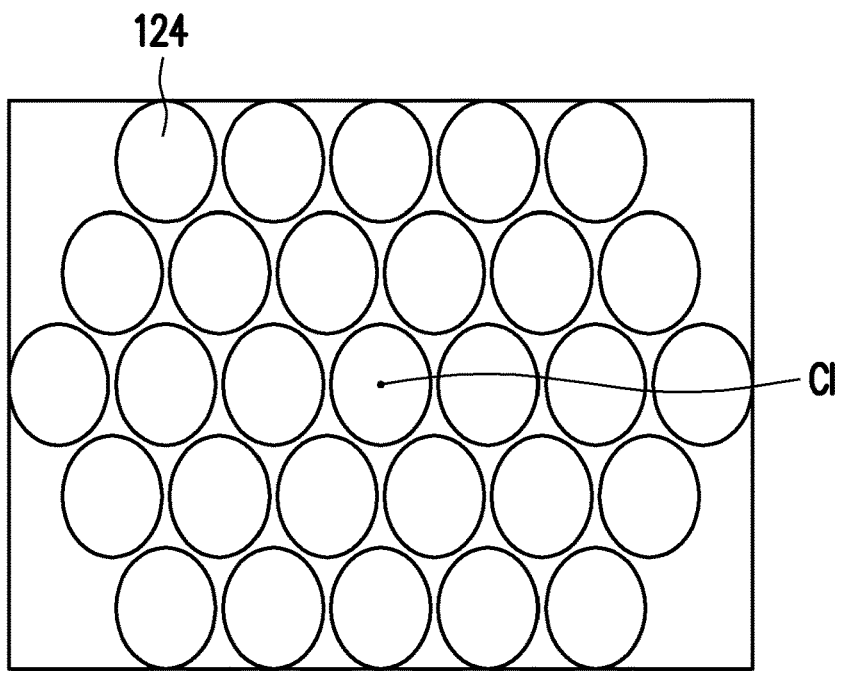
FIG. 9B is a front view of the micro-lens array of the embodiment of FIG. 9A viewed from the display side to the eye side.

FIG. 9A is a front view of a micro-lens array according to another embodiment of the disclosure viewed from the eye side to the display side. FIG. 9B is a front view of the micro-lens array of the embodiment of FIG. 9A viewed from the display side to the eye side.

Referring to FIG. 9A and FIG. 9B, a micro-lens array 120c of this embodiment is substantially similar to the micro-lens array 120 of FIG. 2, and the main difference lies in that the arrangements of eye-side micro lenses 122c and display-side micro lenses 124c are different. Specifically, in this embodiment, the eye-side micro lenses 122c are arranged radially around the central optical axis CI, and the display-side micro lenses 124c are arranged radially around the central optical axis CI. In this configuration, a same pitch is present between any eye-side micro lens 122c and each adjacent eye-side micro lens 122c, and a same pitch is present between any display-side micro lens 124c and each adjacent display-side micro lens 124c, which can effectively increase the number of micro-lenses per unit area of the micro-lens array 120c.

In summary of the above, in the near-eye light field display device of the embodiment of the disclosure, the micro-lens array is disposed between the first lens and the second lens, the eye-side surface and the display-side surface of the micro-lens array are respectively provided with a plurality of eye-side micro lenses and a plurality of display-side micro lenses, and the pitch of the eye-side micro lenses is different from the pitch of the display-side micro lenses. With this design, the brightness of the light field image at a large viewing angle can be increased, and the issue of optical vignetting can be solved. Therefore, the near-eye light field display device has excellent display quality.

The foregoing description of the exemplary embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A near-eye light field display device comprising a first lens, a micro-lens array, a second lens, and a display panel sequentially arranged from an eye side to a display side along a central optical axis, wherein
the display panel is adapted to provide an image beam, and
the micro-lens array comprises an eye-side surface facing the eye side and allowing the image beam to pass through, and a display-side surface facing the display side and allowing the image beam to pass through,
wherein the eye-side surface of the micro-lens array is provided with a plurality of eye-side micro lenses, the display-side surface of the micro-lens array is provided with a plurality of display-side micro lenses, the plurality of eye-side micro lenses are arranged equidistantly in a first pitch, the plurality of display-side micro lenses are arranged equidistantly in a second pitch, and the first pitch is different from the second pitch,
wherein the micro-lens array satisfies a conditional formula: $f_{MLA}>0$, where $f_{MLA}$ is defined by an equation below:

$$\frac{1}{f_{MLA}} = (n-1)\left(\frac{1}{R_1} - \frac{1}{R_2} + \frac{(n-1)d}{nR_1R_2}\right)$$

where $f_{MLA}$ is an equivalent focal length of the micro-lens array, n is a refractive index of a material of the micro-lens array, wherein each of the eye-side micro lenses has a first curved surface facing the eye side, each of the display-side micro lenses has a second curved surface facing the display side, $R_1$ is a radius of curvature of the first curved surface, $R_2$ is a radius of curvature of the second curved surface, and d is a distance between the eye-side surface and the display-side surface.

2. The near-eye light field display device according to claim 1, wherein the display panel has a plurality of display regions, and the plurality of display regions are capable of providing a plurality of sub-image beams to form the image beam, wherein the sub-image beam provided by the display region is correspondingly transmitted to one of the display-side micro lenses and one of the eye-side micro lenses.

3. The near-eye light field display device according to claim 1, wherein the first pitch is less than the second pitch.

4. The near-eye light field display device according to claim 1, wherein each of the eye-side micro lenses has a first optical axis, each of the display-side micro lenses has a second optical axis, and the plurality of eye-side micro lenses correspond to the plurality of display-side micro lenses in a one-to-one manner,
wherein except for a central eye-side micro lens and its corresponding central display-side micro lens,
a distance from the first optical axis of any of the eye-side micro lenses to the central optical axis is defined as a first distance, a distance from the second optical axis of the corresponding display-side micro lens to the central optical axis is defined as a second distance, and an absolute value of a difference between the first distance and the second distance increases from the central optical axis along a radial direction.

5. The near-eye light field display device according to claim 1, wherein a radial direction from the central optical axis to an edge of the micro-lens array is defined, each of the eye-side micro lenses has a first optical axis, each of the display-side micro lenses has a second optical axis, and the plurality of eye-side micro lenses correspond to the plurality of display-side micro lenses in a one-to-one manner,
wherein except for a central eye-side micro lens and its corresponding central display-side micro lens,
the first optical axis of any of the eye-side micro lenses and the second optical axis of the corresponding display-side micro lens are parallel to each other and have a non-zero distance therebetween.

6. The near-eye light field display device according to claim 1, wherein a central eye-side micro lens among the plurality of eye-side micro lenses and a central display-side micro lens among the plurality of display-side micro lenses are optically coaxial with each other.

7. The near-eye light field display device according to claim 1, wherein each of the eye-side micro lenses has a convex surface facing the eye side, and each of the display-side micro lenses has a convex surface facing the display side.

8. The near-eye light field display device according to claim 1, wherein each of the eye-side micro lenses has a concave surface facing the eye side, and each of the display-side micro lenses has a convex surface facing the display side.

9. The near-eye light field display device according to claim 1, wherein each of the eye-side micro lenses has a convex surface facing the eye side, and each of the display-side micro lenses has a concave surface facing the display side.

10. The near-eye light field display device according to claim 1, wherein the plurality of eye-side micro lenses and the plurality of display-side micro lenses are respectively arranged in an array.

11. The near-eye light field display device according to claim 1, wherein the plurality of eye-side micro lenses are arranged radially around the central optical axis, and the plurality of display-side micro lenses are arranged radially around the central optical axis.

12. The near-eye light field display device according to claim 1, wherein the first lens and the second lens both have a positive refractive power.

13. The near-eye light field display device according to claim 1, wherein a number of the plurality of eye-side micro lenses is equal to a number of the plurality of display-side micro lenses.

* * * * *